Patented Mar. 29, 1932

1,851,008

UNITED STATES PATENT OFFICE

HUGO H. HANSON AND STEWART E. SEAMAN, OF BANGOR, MAINE, ASSIGNORS TO EASTERN MANUFACTURING COMPANY, OF SOUTH BREWER, MAINE, A CORPORATION OF MASSACHUSETTS

PREPARATION OF ALPHA CELLULOSE PULP BY ATTRITION

No Drawing. Application filed April 28, 1927. Serial No. 187,410.

This invention relates to a process for the treatment of cellulosic materials of diversified origin, especially those cellulosic materials obtained from perennial plants such as wood, whereby the cellulosic material contained therein is purified in such a manner as to obtain therefrom the maximum of desirable cellulosic bodies while leaving the resultant purified fiber in a physical condition peculiarly susceptible to manipulation in the usual steps of preparing therefrom esters, ethers and other cellulosic derivatives.

More specifically, this invention comprises the purification of cellulose, for example as obtained from wood, either in the original natural form or in the partially purified treated condition known as wood pulp, in such a chemical and physical manner that the same will be especially suitable for the manufacture therefrom of inorganic or organic acid cellulose esters such as the nitrocelluloses or acetated cellulose, or formation of the cellulose ethers typified by the ethylcelluloses, or for the production of other cellulose derivatives and compounds. In attaining this end with the maximum conservation of desirable cellulosic material, the chemical and physical treatment to which the same is subjected is so modified, governed and arranged in sequence that a highly purified cellulose product obtained from a chemical viewpoint, and in a desirable and sensitive condition for nitration purposes, admitting of the formation of maximum amounts of ester of highly desirable stability and physical constants, while but a minimum of the cellulosic material remains in suspension when the esterified cellulose is dissolved for use in the arts.

In comparison with wood pulp, purified cotton fibre has been preferred in many instances in the past for esterification and etherification purposes, primarily on account of the initial purity of cotton, its relatively long fibrous structure, its preliminary resistance to physical treatment and to hydrolysis, and especially to the fact that its morphological structure is such as to admit of nitration and other treatment with the minimum time of treatment with reagents with minimum loss of fibre by nitration and with the minimum time of treatment in removing products of reaction therefrom. However, properly prepared wood cellulose esterifies equally as well as does cotton, a smaller ratio of wood cellulose to esterifying reagents may be used, and the nitrated wood cellulose under comaparable esterification conditions of time, acid bath strength and the ratio of esterifying to non-esterifying components contained therein, produces an ester of markedly lower viscosity coupled with an increased ease of solubility, both important technical factors where the cellulosic ester is to be used in the arts in solution on account of the fact that the ester goes into solution more readily and when dissolved produces a solution of greater thinness per unit weight of cellulose ester dissolved therein, which means that less solvent is required per unit weight of cellulose ester deposited—an important factor in the absence of adequate solvent recovery systems.

For this and other reasons, wood cellulose possesses distinct advantages over cotton cellulose after transformation into cellulosic derivatives.

For many years investigators have apparently focussed their inventive ingenuity on the problem of obtaining a purified wood cellulose satisfactory for esterification purposes, but have apparently given secondary consideration to the equally important phase of the physical condition of the purified pulp in relation to the mechanics of esterification and the necessary processes subsequent thereto. It is one of the purposes of this invention to disclose a method whereby a properly purified wood cellulose may now be used for esterification purposes of maximum utility from the viewpoint of yield, solubility, facility of purification and of stability, viscosity and tensile strength desired.

For example, to prepare a chemically suitable material for these purposes, the original cellulose, or a partially purified cellulose of wood pulp, may be purified to a high alphacellulose content by the methods set out in copending applications of Charles A. Blodgett and Hugo H. Hanson Serial No. 113,551, filed June 3, 1926; Serial No. 87,806, filed February 12, 1926 and Serial No. 127,700, filed August 6, 1926. Such methods include, briefly, a preliminary preparation of wood pulp by known chemical processes such as the sulfite process (which may be shortened somewhat to an incomplete or "raw" cook) followed by an after treatment with a reactive liquor, typically an alkaline sulfite solution. After such purification treatment, the pulp is washed and water is preferably removed therefrom by ways now known, thus resulting in the formation of a wood cellulose substantially free from celluloses other than resistant or alpha-cellulose, of low ash, high permeability to liquids and uniform as to composition.

The preparation of the pulp in a physical condition especially suitable for conversion into the various cellulosic derivatives and the like may be accomplished by subjecting the purified pulp to attrition, preferably under impact as contrasted with tearing or cutting of the fibers.

As an illustrative example of our process, cellulose may be used which has been obtained by purification of wood pulp as above set forth, the moisture having been removed therefrom down to normal atmospheric moisture by any approved drying process. The purified wood fibers at this moment, consist of matted, interlaced, and intricately blended groups of fibers, the interweaving and intertwining materially interfering with uniform esterification. The purified fibers—otherwise of maximum usefulness for ester formation,—may then be brought into the desired physical condition without undue waste (as by the production of minute fibers in the broken condition of "dust", which tends to pass away with the spent acid, to cause loss in yield, and to foul the acid and make its recovery difficult for re-use) by subjecting the same to attrition in the following manner.

A suitable attrition mill consists of two iron or steel discs independently rotatively mounted face to face, with a slight clearance between them. At least one of these disc faces is corrugated, preferably both, the corrugations may be radial, or otherwise disposed so as to produce impact on the fibrous material when the discs are given rapid, directionally differential, rotation. In operation, the purified cellulosic material is fed between these discs as through an aperture in the center of one of the discs for example the centrifugal force of the discs in motion causing the lumps of fibers to be disintegrated with the minimum of tearing or rupture of the same, and causing the now de-interlaced fibers to be thrown out between the discs. That is, the passage of the lumps or knots of fibers from the center to the periphery under the conditions of operation causes the fibers to issue by means of the centrifugal force and the mechanical process of gentle attrition to which the material is subjected, substantially as individual fibers or fibers in a condition especially suitable for uniform esterification or etherification purposes. Relatively speaking, but few of the fibers are found to have been broken by this centrifugal attrition treatment when properly conducted and when operating upon a purified wood pulp of the nature and composition of that referred to in this description. The relation in distance from one disc to another, the composition of the discs and the revolutions per minute are factors which will be varied depending upon the physical condition of the entering wood fibers and the physical condition of the outgoing fibers. For instance, it will be recognized that it is not as essential that as great a degree of divisibility of fibers is necessary in acetation processes where the ester formed is soluble in the esterification bath, as would be advisable in nitration processes, wherein the nitric ester produced is insoluble in the nitrating bath.

A satisfactory and safe rate of operation of such apparatus, having discs about 3 feet in diameter for example, is found to lie between 1400 and 1800 R. P. M., the degree of de-interlacing of the fibers varying with the speed of rotation.

The proximity of the corrugations on one disc relative to the corrugations on the other disc during their revolution is of moment, it having been found that best results for the purposes herein set forth are attained when the opposed faces or corrugations of the discs are from 0.01 to 0.03 of an inch apart. The corrugations must come sufficiently close so that each aggregate is reduced substantially to individual fibers, but not sufficiently close so that a substantial proportion of the individual fibers are ruptured or cut. When the surfaces or corrugations on the opposite faces of the discs come unduly close together, heat is developed and scorching of the fibers is prone to take place. In practice, in order to produce the maximum output in a given period of time, it is advisable that air be allowed to pass in and through the plates or corrugations. The amount of air desired will vary depending upon the R. P. M. of the discs and the tensile strength of the individual fibers, and also upon the degree or percentage of matting of the fibers as entering the machine.

The particular size, or configuration of the corrugations is not essential so long as the corrugations, (at the speed of revolution and spaced within the substantial limits above mentioned) produce the maximum of desirable material in the minimum of working time. The arrangement of the air inlet to and through the discs and corrugations thereon, is so arranged that a suction of vacuum effect is induced to the entering fibers, thus facilitating their uniform distribution. The toughness or tensile strength of the entering fibers and the degree of agglomeration or matting of the same will vary the working factors as above described, this description being especially applicable to the type and purity of wood cellulose as prepared according to the co-pending applications cited. This variation, in turn, is governed in a large measure by the nature of the raw material operated upon, and the degree of drastic treatment in the series of purification steps to which it has been subjected, especially as to its "softness" and "feel". In the illustrative example above detailed conditions optimum to the treatment of the kind of pulp referred to are described, but it is to be understood that the apparatus design and factors governing operation may be varied within comparatively wide limits without departing from the essence and spirit of the invention.

For example it is possible to produce a fairly satisfactory material by having one of the discs of the attrition mill stationary and revolving one only. It is also possible to get a fairly satisfactory material by the use of other types of attrition disintegrators, the swing hammer type, but we prefer to use the corrugated disc type with both discs revolving in opposite directions.

If it is desired, a blend of other fibers than wood may be made with the purified wood fibers before entering between the revolving discs and thereby form uniform mixtures of wood cellulose with cotton cellulose or other form of celluloses. Mixtures of such celluloses are now widely used in the arts for the preparations of cellulose compounds, as is well known.

The wood pulp fibers differ in their physical appearance and properties from similarly purified fibers heretofore used in the art in that said wood cellulose emerges from the disintegrating machine in practically individual form, and therefore in the maximum desirable physical condition for uniform esterification, especially nitration. Wood pulps as ordinarily packed and shipped have the fibers densely packed and matted in sheet form, and incrusting matter still on the fibers tends further to agglomerate and agglutinate the fibers together. Thus the product ordinarily prepared weighs some 40 pounds per cubic fot.

In contradistinction to this, the product resulting from the proper application of this invention, wherein the incrusting materials on the surface of the fibers have been dissolved out and removed by chemical treatment, and the cellulosic mass then physically disintegrated and separated until the mass is substantially in the individual fiber form, results in the formation of a uniformly fluffy mass of great uniformity and voluminosity, the fibers emerging from the mill weighing but about 1 pound per cubic foot. This product may be compressed without damage to its physical form in bales until it weighs 10-15 pounds per cubic foot, when it is still an entirely different appearing and acting product from ordinary wood pulp, especially when immersed in a normal nitrating bath.

The cellulosic fibrous product resulting from the application of this invention in the manner indicated herein, is sharply distinguished from wood pulps heretofore produced, in that the product combines the maximum purification from undesirable by-products and subsidiary products, is unusually high in desirable or resistant cellulose, and is in such a desirable physical condition, that it is "wetted" uniformly by the esterifying liquid almost instantly and hence with practically absolute uniformity as regards penetration of esterifying fluid.

Accordingly, the cellulosic fiber thus obtained, is superior to all forms of cellulose heretofore derived from wood for the purposes detailed in this invention, some of the more specific points of superiority being:—

*In conversion to nitrocellulose.*—Facility and uniformity of immersion in nitrating baths at a wide range of temperatures and nitric and sulfuric acid concentration: substantially immediate esterification to a uniform nitrogen content ester; absence of gummy particles in the esterifying bath and in solutions of the purified ester in solvents and immiscible dissolving combinations; ease in purification (boiling off, poaching, hydro-extracting); ready stabilization to a product conserving stability for an indefinite period; facility of solubility to clear solutions of practically no color; low viscosity in solution with maximum strength in the form of films and filaments; ready and permanent plasticity with a wide range of thermoplasticizers; freedom from discoloration by light for long periods of time; and readiness of filtration with a minimum of insoluble portion when properly nitrated.

*In conversion to acetated cellulose.*—Freedom from solubility in glacial acetic acid; ready and uniform solubility in normal acetating mixtures at low temperatures with a great variety of catalysts; ready partial hydration of acetylated cellulose to a wide range of viscosities in solution; ready precipitation in granular or fluocculent form; easy removal of products of reaction in the deacidification and stabilization steps of manufacture; and ease of drying on account of uniformly fluocculent condition of product prepared together with a complete solubility in acetone.

*In making etherified cellulose.*—Immediate and uniform distribution of alkali in alkali-cellulose manufacture and the ready disintegration of same after hydrolysis with NaOH; use of the minimum of alkylating (ethylating) agent in cellulose ether formation, and admitting of the production of esters of wide and very ready solubility in-solvents and solvent combinations.

*In rayon filament formation.*—Facility of alkali-cellulose formation and minimum maturing time of same; ready solubility of alkalized cellulose in carbon bisulfide, and the filtration of the same with but trifling residue during the phases of ripening; ease of solution without residue in cuprammonium solutions, and admitting of ready copper removal from same; complete desulfurization of viscose rayon at low temperatures and with the minimum of washing and after treatment.

We claim:

1. Method of preparing cellulose for treatment such as esterification or etherification, characterized by submitting air dry cellulosic fibrous material to impact-attrition.

2. Method of preparing cellulose for treatment such as esterification or etherification, characterized by submitting dry cellulosic fibrous material to impact-attrition with circulation of air through the material.

3. A method of preparing cellulose especially suitable for cellulose derivative manufacture, which comprises the step of subjecting purified dry cellulosic material to a rapid succession of impact-attritions.

4. A method of preparing cellulose especially suitable for cellulose derivative manufacture, which comprises the step of subjecting a stream of purified dry cellulosic material in separated condition and carried by a current of air to a rapid succession of impact-attritions.

5. A method of preparing cellulose especially suitable for cellulose derivative manufacture, which comprises the step of subjecting purified dry cellulosic material to a rapid succession of impact-attritions between oppositely moving surfaces.

6. A method of preparing cellulose especially suitable for cellulose derivative manufacture, which comprises the step of subjecting purified dry cellulosic material to a rapid succession of impact-attritions between oppositely moving surfaces slightly spaced apart (in the order of .01 "to .03").

7. A method of preparing cellulose especially suitable for cellulose derivative manufacture which comprises the step of subjecting purified dry cellulosic material to a rapid succession of impact-attritions between oppositely moving, spaced surfaces, of progressively increasing speeds.

8. A method of preparing cellulose especially suitable for cellulose derivative manufacture which comprises the step of subjecting purified dry cellulosic material to a rapid succession of impact-attritions between oppositely moving surfaces of progressively increasing speeds and spaced apart by a distance of the order of .01 "to .03".

Signed by us at Bangor, Maine, this 26th day of April, 1927.

HUGO H. HANSON.
STEWART E. SEAMAN.